INVENTORS:
RUDOLPH F. MALLINA
& THEODORE R. MILLER,

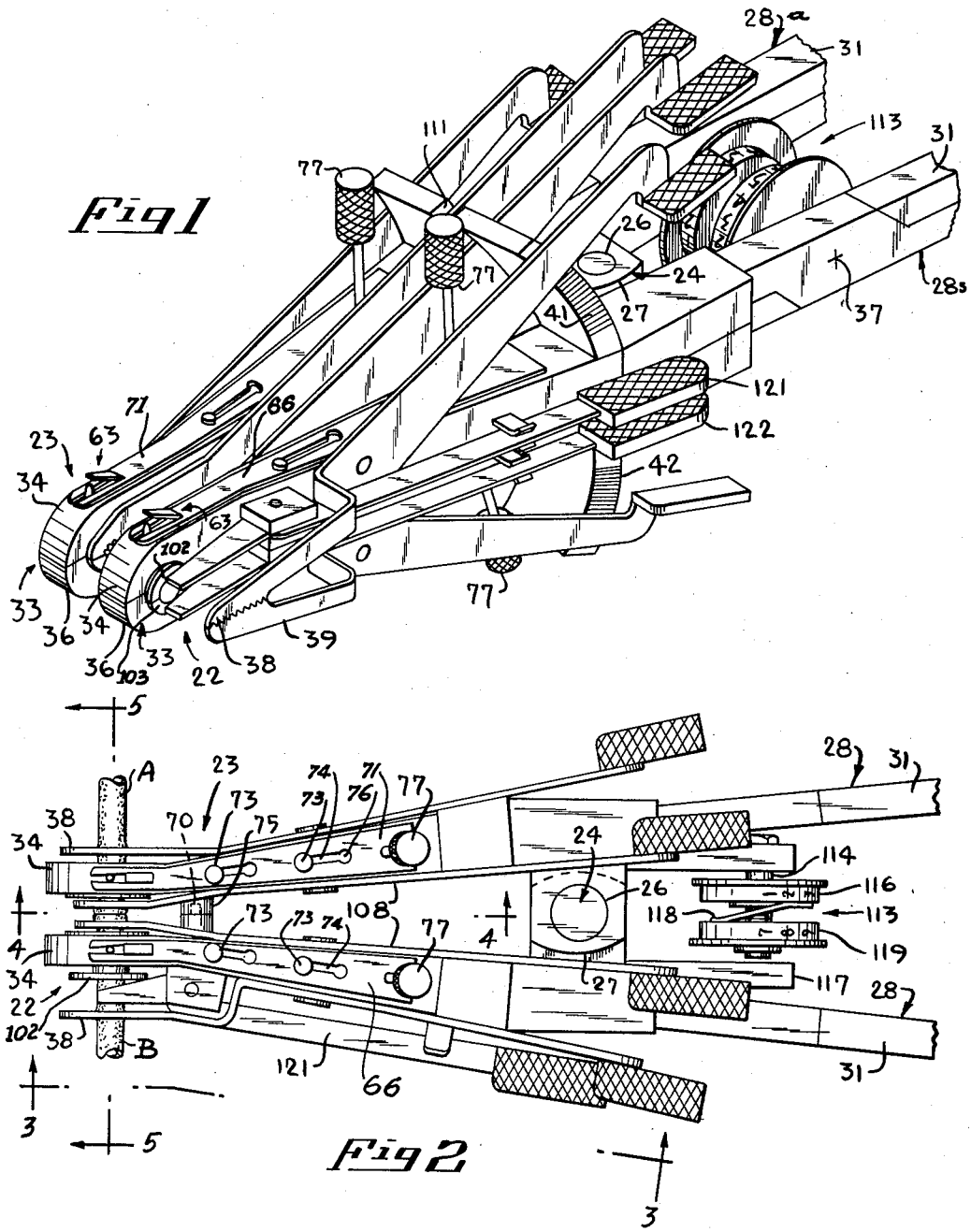

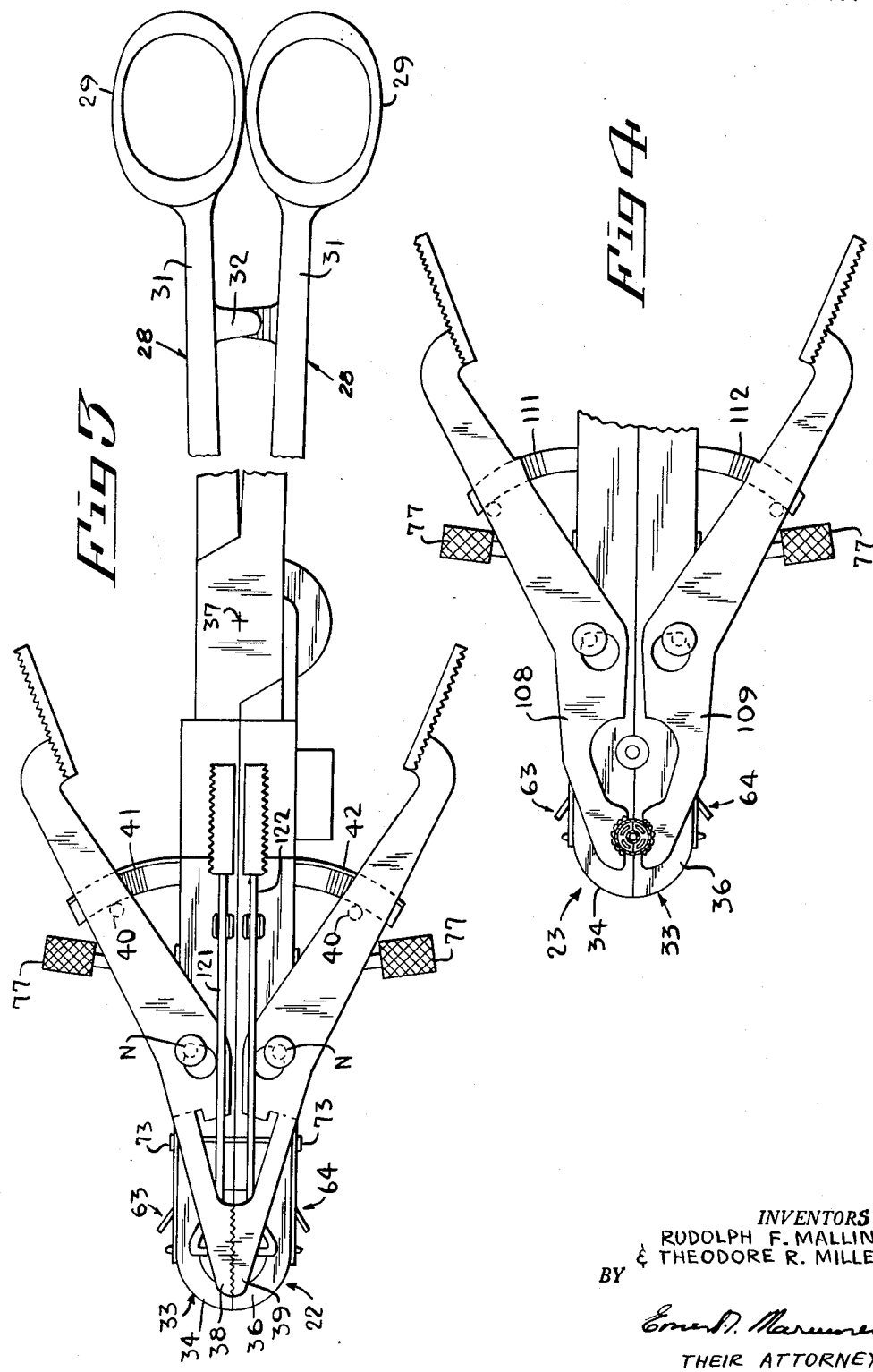

BY

THEIR ATTORNEY

INVENTORS:
RUDOLPH F. MALLINA
& THEODORE R. MILLER,
BY
THEIR ATTORNEY.

Aug. 18, 1964  R. F. MALLINA ETAL  3,144,654
MEDICAL STAPLERS

Filed Nov. 22, 1961  6 Sheets-Sheet 5

INVENTORS:
RUDOLPH F. MALLINA
& THEODORE R. MILLER,

BY
THEIR ATTORNEY.

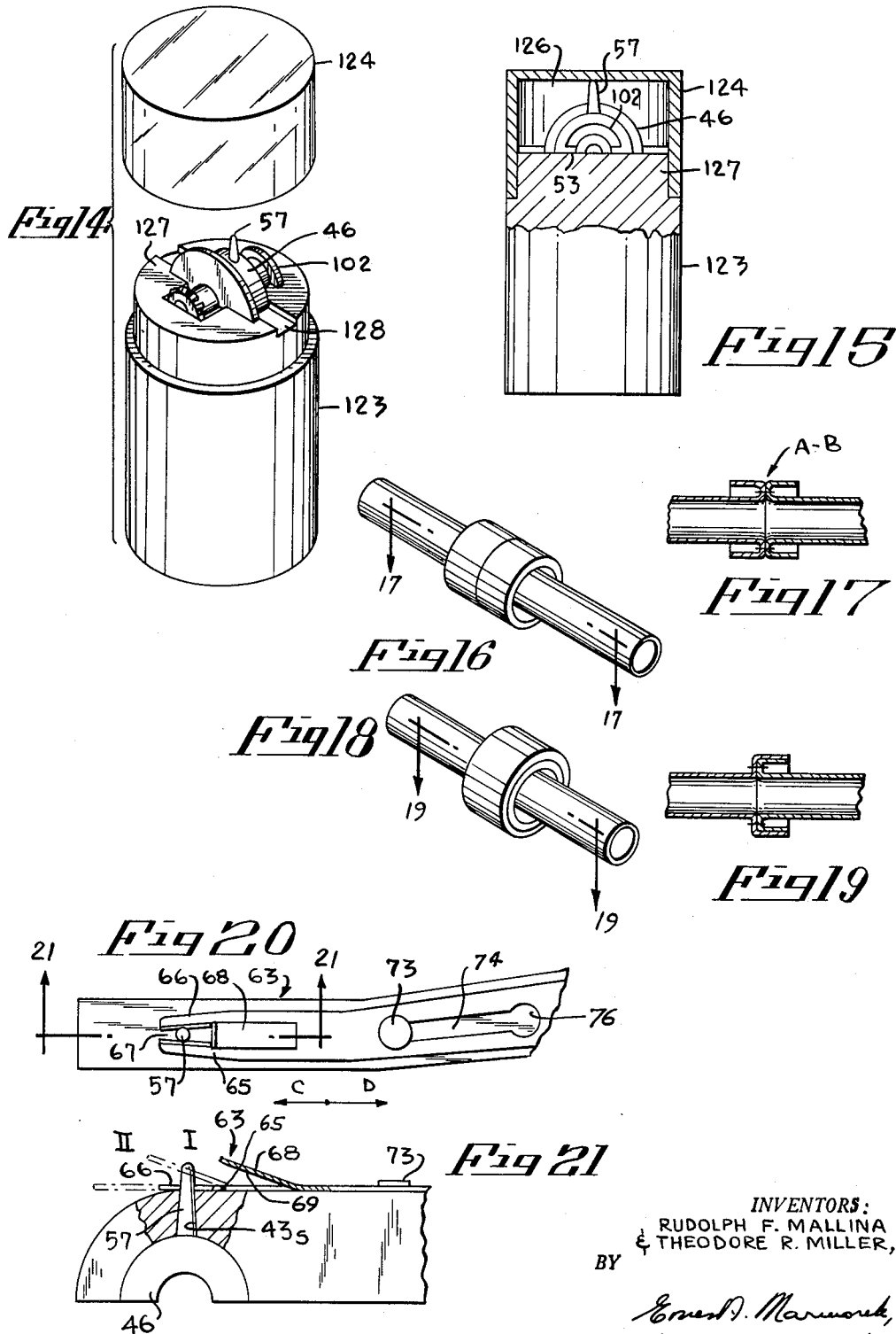

United States Patent Office 3,144,654
Patented Aug. 18, 1964

1

3,144,654
MEDICAL STAPLERS
Rudolph F. Mallina, Hastings on Hudson, and Theodore R. Miller, New York, N.Y., assignors to Foundation for Medical Technology, a corporation of New York
Filed Nov. 22, 1961, Ser. No. 154,187
14 Claims. (Cl. 1—50)

The invention relates to surgical instruments, and relates more particularly to medical stapling instruments or staplers for the anastomosis of circulatory vessels, such as the joining of blood vessels and similar linear structures such as lymphatics, nerve fascicles, tendons, and the like.

The most conventional way of reconnecting a severed blood vessel is by manual suturing, in which the surgeon uses a curved needle with a silk thread attached and held in specially designed forceps to sew the ends of a vessel together for re-establishing therein the flow of blood. In large vessels, this type of anastomosis, however time consuming and demanding of surgical skill, produces a reasonably satisfactory connection between the two vessel ends. For small vessels, however, this type of connection becomes difficult; for very small blood vessels, which may have a diameter of 2 mm. or smaller, suturing of the ends by hand is a difficult and often impossible task.

It is accordingly among the principal objects of the invention to provide a stapler with the aid of which the ends of circulatory vessels may be re-connected safely and reliably, equally well for large, for small, and even for very small vessels.

It is another object of the invention to provide such a stapler that is reliable in use and easy to sterilize, and to maintain sterile.

Other objects of the invention will in part be obvious and in part will appear hereinafter.

Medical staplers have recently become known for the joining of blood vessels, one of Russian origin, one of Japanese and one of Canadian origin.

Desirable features for such medical staplers include speed and reliability of operation of the instrument during surgery, and these features are generally found in medical staplers designed heretofore. Previous medical staplers, however, were deficient in that they demanded of either the surgeon or the hospital personnel extraordinary skill and patience to load the miniature staples on the spot, just before the operation in order to maintain sterility; furthermore, the sterilizing of the old staplers and staple carriers even with skilled help was troublesome; and it proved to be difficult to prevent the staples from prematurely falling out of the instrument during the surgery; lastly, the earlier medical staplers were complicated in holding the staple carriers in place, and in retaining on the instrument the blood vessel ends before these ends were stapled together.

It is accordingly among the further objects of the invention to provide a medical stapler that avoids the drawbacks of present medical staplers.

It is still another object of the invention to provide a medical stapler that has semi-cylindrical bushing-halves with locating means in order to position each two bushing-halves in alignment to complete a cylindrical bushing.

It is yet another object of the invention to provide bushing-halves of the aforesaid type that are composed of molded plastic that may be translucent or even transparent, and which may be preloaded and pre-sterilized and be retained in that status until actually needed in the stapler.

It is a further object of the invention to provide a bushing-half of this type which has a toothed or serrated rim portion that together with another bushing-half completes

2 a hollow tube with a serrated rim to engage the end portion of a circulatory vessel that extends through the tube and is cuffed over the rim.

It is another object of the invention to provide an anvil, for the staples, which has a top surface and two arcuate clinching grooves each with an oblique straight staple entrance guiding portion.

With the above and other objects of the invention in view, the invention consists in the novel construction, arrangement and combination of various devices, elements and parts, as set forth in the claims hereof, one embodiment of the same being illustrated in the accompanying drawings and described in this specification.

The foregoing and other objects of the invention will be best understood from the following description of an exemplification thereof, reference being had to the accompanying drawings wherein:

FIG. 1 is a fragmentary perspective view of a medical stapler in accordance with the invention;

FIG. 2 is a fragmentary plan view of the stapler shown in FIG. 1, but showing a circulatory vessel mounted on the stapler;

FIG. 3 is a fragmentary side elevational view as seen in the direction 3—3 of FIG. 2, though without vessel;

FIG. 4 is a fragmentary side elevational view taken on the line 4—4 of FIG. 2, though without vessel;

FIG. 14 is an extended view in perspective of a cartridge for a staple bushing-half;

FIG. 15 is a side elevational view, partly in section, showing the cartridge of FIG. 14 closed by the lid;

FIG. 16 is a perspective view, partly in section, of two vessel ends that have been stapled together by means of a stapler in accordance with the invention;

FIG. 17 is a fragmentary sectional view taken on the line 17—17 of FIG. 16;

FIG. 18 is a perspective view, partly in section, of a modified blood vessel joint made also by a stapler of the instant invention;

FIG. 19 is a fragmentary sectional view taken on the line 19—19 of FIG. 18;

FIG. 20 is a large scale plan view showing a detail of the latching mechanism for the locating pin of a bushing-half shown in FIG. 2; and FIG. 21 is a large scale sectional view taken on the line 21—21 of FIG. 20

Figure 5:
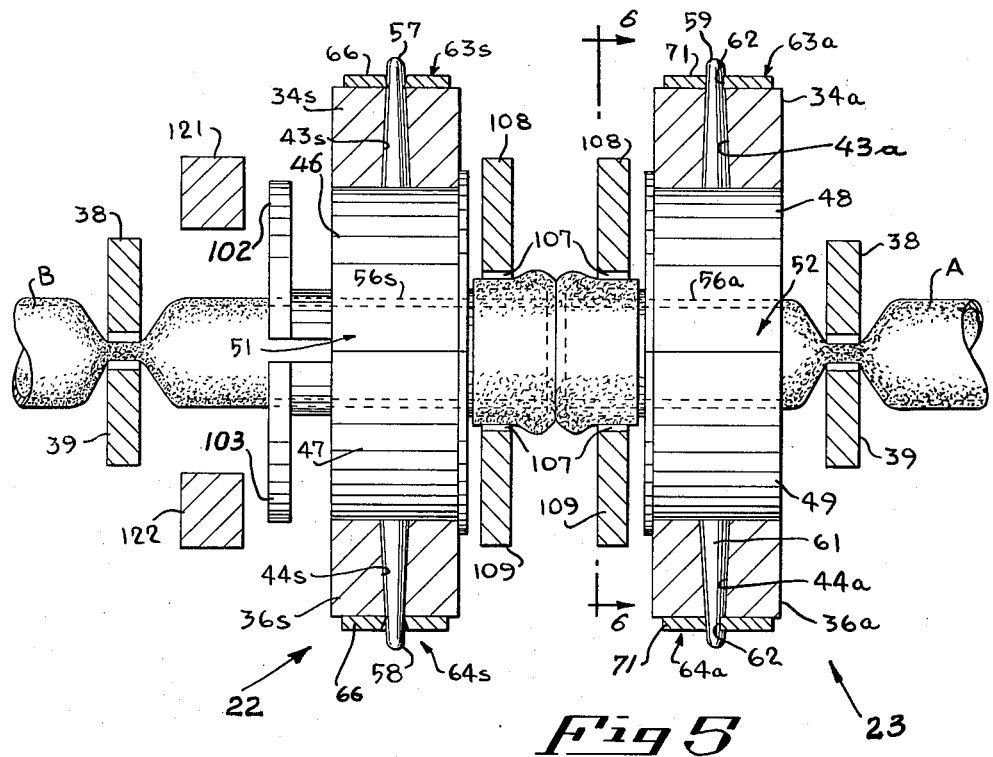
FIG. 5 is a large scale fragmentary sectional view taken on the line 5—5 of FIG. 2 showing the vessel mounted on the stapler.

In carrying the invention into effect in the embodiment which has been selected for illustration in the accompanying drawings and for description in this specification, and referring now particularly to FIGS. 1 and 2, there is provided a medical stapling instrument or stapler which includes two sections, namely a stapler section 22 and an anvil section 23.

Hinge means 24 are provided, such as a pin 26 and a boss 27 that has an aperture fitted to receive releasably the pin 26. The pin 26 is slightly tapered, shiftable and rotatable relative to the boss 27 when inserted into the aperture thereof. The pin 26 and the boss 27 are arranged between the sections 22 and 23 for releasably interengaging the two sections. The two sections will be separate from each other during cleaning, sterilizing and mounting of the ends of a circulatory vessel such as a blood vessel, but after each vessel end is engaged on a section, the surgeon or other operator, as more fully explained below, will interengage the sections 22 and 23 by the hinge means 24, before proceeding with the actual stapling.

*The Construction of Each Section*

As best shown in FIG. 3, each section includes a pair of forceps 28 with handles 29 mounted at the rear end of arms 31, an adjustable lock 32, and a bearing structure 33 in front including an upper jaw or part 34 and a lower jaw or part 36. The arms 31 are pivoted about an axle 37, to open and close the bearing structure 33. Normally, the forceps 28 are closed, the lock 32 holding the arms 31 in the position shown in FIG. 3, with the upper and lower jaws 34 and 36 of the bearing structure 33 abutting against each other. After the stapling has been completed, the surgeon will push apart the handles 29, to open the jaws of the bearing structure 33.

As stated in the foregoing, each of the sections 22 and 23 has the forceps 28 with the parts described in the foregoing, and the reference numerals are shown in FIG. 3 without any index. To distinguish between the anvil section and the stapler section, however, the same reference numerals have received in FIGS. 1 and 2, and in some of the other views, an appropriate index letter so that for instance the forceps 28 indicated as 28a for the anvil section and as 28s for the stapler section.

Each of the forceps includes a pair of vessel clamps, namely an upper clamp 38 and a lower clamp 39, which serve together to engage each vessel A and B respectively at a distance from the very vessel ends, as best shown in FIG. 5. The engagement by the vessel clamps 38 and 39 renders it possible for the surgeon to work at the ends of the vessels A and B, as indicated below, free from any longitudinal tension applied thereto. The vessel clamps 38 and 39 serve to connect releasably each vessel end portion to the stapler, and these clamps will only be released by the operator after the stapling has been completed.

Each of the vessel clamps 38 and 39 is movable with its lever along a serrated arcuate ratchet guide 41 and 42, respectively, which is engaged by the respective vessel clamp lever so as to hold the vessel clamp in any position along the guide. The ends of the vessel clamps 38 and 39 carry teeth which are matching for possible interengagement, and which hold the vessel. A guide pin 40 (FIG. 3) is provided for each lever that guides the lever, and itself is guided along the inner arcuate edge of the guide 41, 42.

The bearing structure 33 of each section has a bore, namely the upper part 34 has a bore 43 (FIG. 5) and the lower part 36 a bore 44. Preferably, the bores 43a, 43s, 44a and 44s are tapered in accordance with a non-locking taper to receive, as described below, a locating pin 57, (58, 59, 61) having the same non-locking taper.

*The Bushing-Halves*

In the bearing structure 33 of each of the sections 22 and 23 there are disposed two bushing-halves completing together a bushing. Thus, there is disposed in the upper bearing structure 34s of the stapler section 22 an upper staple bushing-half 46, and in the lower bearing structure part 36s of the stapler section 22 there is disposed a lower staple bushing-half 47. Similarly, in the upper part 34a of the bearing structure 33a of the anvil section 23 there is disposed an upper anvil bushing-half 48, and similarly in the lower part 36a there is disposed a lower anvil bushing-half 49. The pair of upper and lower bushing halves 46 and 47, and the pair of bushing-halves 48 and 49, each completes in its section a bushing; thus the bushing-halves 46 and 47 complete a staple bushing 51, and the bushing-halves 48 and 49 complete an anvil bushing 52.

Figure 8:
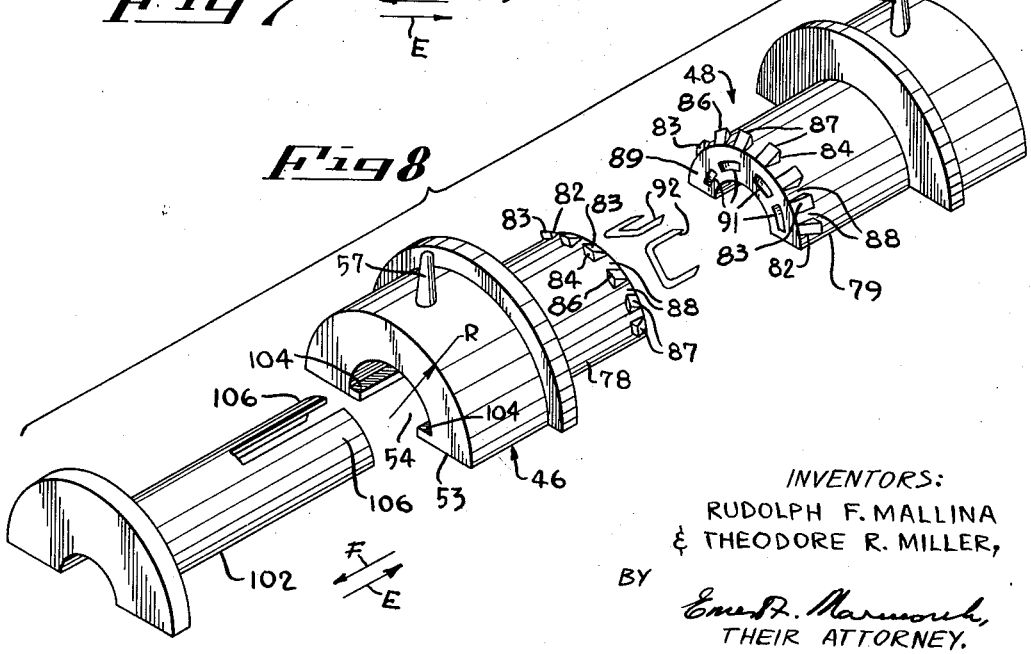
FIG. 8 is an extended view, in perspective, of one staple bushing-half with staples and a staple driver, and one anvil bushing-half therefor.

As best shown in FIG. 8, each bushing-half is of semi-cylindrical shape, and may be hollow. Each bushing-half is bound by a diametrical end surface 53 with which it abuts against the corresponding diametrical end surface 53 of the other bushing-half of the pair of the same bushing. From the surface 53 there is recessed in each bushing-half a semi-cylindrical cavity 54.

Figure 11:
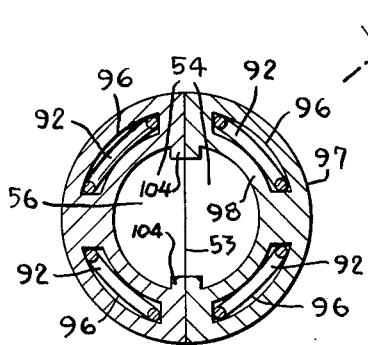
FIG. 11 is a sectional view taken on the line 11—11 of FIG. 7.

When the two bushing-halves of each pair are assembled to form the cylindrical bushing, the two opposite cavities 54 combine into a cylindrical passage 56, as best shown in FIG. 11. As evident from FIG. 7, the vessel end portions A and B extend through these passages 56a and 56s, respectively.

Each bushing-half has a locating pin, namely the bushing half 46 has the locating pin 57 that engages the bore 43s (FIG. 5); in a similar manner, the bushing-half 47 carries a pin 58 that engages the bore 44s; the bushing-half 48 carries a pin 59 that engages the bore 43a; and the bushing-half 49 carries a pin 61 that engages the bore 44a. As previously stated, each bore may be tapered in accordance with a non-locking taper and the pin tapered in accordance with the same non-locking taper. Each of the anvil pins 59 and 61 has a groove 62.

Latching means are provided between each locating pin and its respective section. In the stapler section 22 there is provided a latching means on the upper as well as the lower part of the bearing structure 33, namely an upper staple bushing latching means or lock 63, which engages releasably the pin 57 of the upper bushing-half 46; and a lower latching means or lock 64 for the pin 58 of the lower bushing-half 47. Each of the locks 63 and 64 includes a shiftable plate 66 (FIG. 20), which has an elongated tapered slot 67 (FIG. 5); the narrow portion of the tapered slot 67 is slightly smaller than the width of that part of the locating pin that protrudes through the slot 67, so that the plate 66 will engage the plastic pin, by actually cutting into it with the edges of its slot 67.

The plate 66 is movable longitudinally in the opposite directions C and D (FIGS. 20, 21) between two positions I and II. The plate 66 has an elevation 68, and the tapered slot 67 is formed in the forward end. In the holding position I (on the right in FIG. 21), the slot 67 engages the locating pin 57 of the bushing-half (FIG. 5) and cuts into it and thereby holds it to prevent retraction of the pin from the bore 43s. By moving the plate 66 in the direction C from the holding position I, however, the edges of the slot 67 will release the pin 57, so that there will no longer be any engagement between the pin 57 and the plate 66.

By moving the plate 66 further in the direction C, the plate 66 will be brought into an ejecting position II (to the left in FIG. 21). During this movement, a cam, such as an inclined cam surface 69 of the elevation 68 will engage the tip of the pin 57 and by cam and cam follower action will expel the pin 57 from the bore 43s, and thereby the bushing-half 46 from its emplacement in the upper jaw 34.

During insertion of the pin 57, the plate 66 will be positioned in the ejecting position II, and the operator will press the pin 57 against the cam surface 69, thereby causing a slight bending of the tip of the pin 57; thereafter, the operator will move the plate 66 in the direction D into the holding position I, to engage the pin with the edges of the slot 67.

If desired, the straight part 65 of the plate 66 may, as shown, be made longer to provide a "neutral" position, in which the immision path of the pin 57 is completely cleared by the slot 67 as well as by the cam surface 69.

What has been said in the foregoing about the pin 57 and the bore 43s and the releasable lock 63 of the staple bushing-half 46 is equally applicable to the pin 58 of the other staple bushing-half 47 locked releasably in its bore 44s. Similarly, each locating pin of the anvil bushing-halves 48, 49 also rests in its bore having a non-locking taper. The locking of the anvil bushing pins is, however, slightly different from the locking of the staple bushing pins. The pins 57 and 58 of the staple bushing-halves, as brought out in detail below, preferably are made of plastic so that these pins can be engaged, by cutting into their surfaces, by the plates 66. The pins 59 and 61 of the anvil bushing-halves, however, may be made of hard material, for instance metal. Each plate 66 will in the holding position I cut into the plastic pin of the staple bushing-half 46, 47 with its knife-like edges of its slot 67; in contrast thereto, the pins 59 and 61 of the anvil bushing-halves 48 and 49 each have the groove 62 which is engaged by an edge of a slot of a plate 71 which, however, in contrast to the plate 66 may have a dull edge rather than a sharp cutting edge near the slot. In all other respects, the plate 71 operates like the plate 66.

Each of the plates 66 and 71 is movable on the surface of its respective section and is connected thereto movably by means of pin-and-slot connections. As best shown in FIGS. 2 and 20, headed pins 73 are provided which guide slots 74 for straight reciprocable movement of the plates 66, 71. Each slot 74 has a widened part 76 which is larger than the head of the pin 73, so that each plate 66 (71) may be moved out of its engagement with its respective section in the forwardmost position beyond the ejecting position II.

Each plate carries a handle 77 (FIG. 1) which is secured to, and movable with, the respective plate in the opposite directions C and D.

Each of the bushing-halves 46, 47, 48 and 49 has a neck portion, which is designated 78 (FIG. 8) for the staple bushing-halves 46 and 47, and respectively designated 79 for the anvil bushing-halves 48 and 49. When the two bushing-halves of either section complete a bushing in the respective bearing structure of the instrument secion, for instance the bushing-halves 46 and 47 complete the bushing 51, the neck portions 78 of these bushing-halves complete in that position a projecting tube 81 (FIG. 7) which surrounds the cylindrical passage 56. Each neck portion 78 has near the forward end a rim portion 82 which defines a conical surface 83 that forms an acute angle with the external surface of the neck portion 78, and defines a rear surface 84 that is radial with respect to the neck portion 78. Thus, the rim portion 82 is thicker than the neck portion 78 and has its surface 83 slanting forwardly and inwardly from the outermost circumference which is formed by the intersection of the surface 83 with the rear surface 84.

In the foregoing, the surface 83 has been described as conical; actually, it may instead, as best shown in FIG. 8, be formed of a series of interrupted plane surfaces which together and with interruptions approximate the outline of a conical surface. As shown in FIG. 8, the rim portion 82 is formed by a series of individual teeth 87 which are disposed near the forward end of the neck portion 78 and which have therebetween spaces 88. Each tooth 87 may be bounded by a plane inclined surface and by a radial surface, the inclined surfaces together approximating the conical surface 83, and the radial surfaces together defining the rear surface 84. The circumference forms a sharp edge 86 on each tooth 87.

Each neck portion 79 of the anvil bushing-half has a similarly arranged rim portion 82 and the surfaces 83 and 84, that may be broken up to form the teeth 87.

Each of the anvil bushing-halves 48 and 49 carries on its radial front face 89 of the neck portion 79 a pair of clinching grooves 91 for each staple. Thus, in the embodiment shown in FIG. 8, where each staple bushing-half holds and ejects two staples 92, there are provided two pairs of clinching grooves 91 in the anvil bushing-half.

Figure 9:
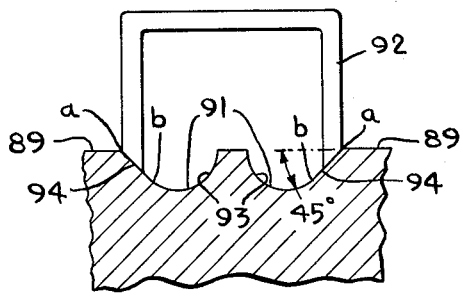
FIG. 9 is a large scale fragmentary sectional view showing a staple engaging an anvil clinching groove in accordance with a feature of the instant invention.

Each clinching groove 91 includes an arcuate portion 93 (FIG. 9) and between the points "a" and "b" a plane or straight end portion 94 that tangentially leads into the arcuate portion 93. The portion 94 forms an acute angle with the radial face 89, for instance of 45°. The two straight portions 94 form the entrance parts of the clinching grooves for the staples 92.

The neck portion 78 of each staple bushing-half 46 and 47, on the other hand, has on its interior receptacles 96, one for each staple 92, that are formed between the outer wall portion 97 and the inner wall portion 98. Each receptacle 96 has segmental shape, and forms an arcuate port 99 at the intersection of the receptacle with the radial front face 101 of the neck portion 78. The rearward end of each segmental receptacle 96 intercommunicates with the cavity 54.

The segmental receptacles 96, as well as their arcuate ports 99, are arranged along a circle coaxially with the neck portion 78 and hence coaxially with the bushing 51.

Figure 10:
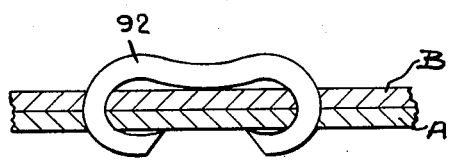
FIG. 10 is a large scale fragmentary sectional view showing completion of the staple engagement of the vessel tissues.

During use of the instrument, each port 99 is put in juxtaposition opposite each pair of anvil cams 91, so that each staple 92 (FIG. 8) will cooperate with its respective pair of anvil cams 91 (FIG. 9) to deform the staple 92 to hold together the two layers of vessel tissue (FIG. 10).

Movable staple propelling means, such as a staple driver, is disposed in each staple bushing-half. Thus, a staple driver 102 is shiftable in the bushing-half 46, and a staple driver 103 in the staple bushing-half 47. Each staple driver is supported in the cavity 54 of the bushing-half by projecting flanges 104 of the bushing. Each staple driver has one arcuate finger for each receptacle 96, thus two fingers 106 being shown in FIG. 8, one to expel a staple 92 from each of the two receptacles 96 shown. The driver 102 is thus held in its place in the bushing-half by the flanges 104 and by the resting of its fingers 106 in the receptacles 96.

Figure 7:
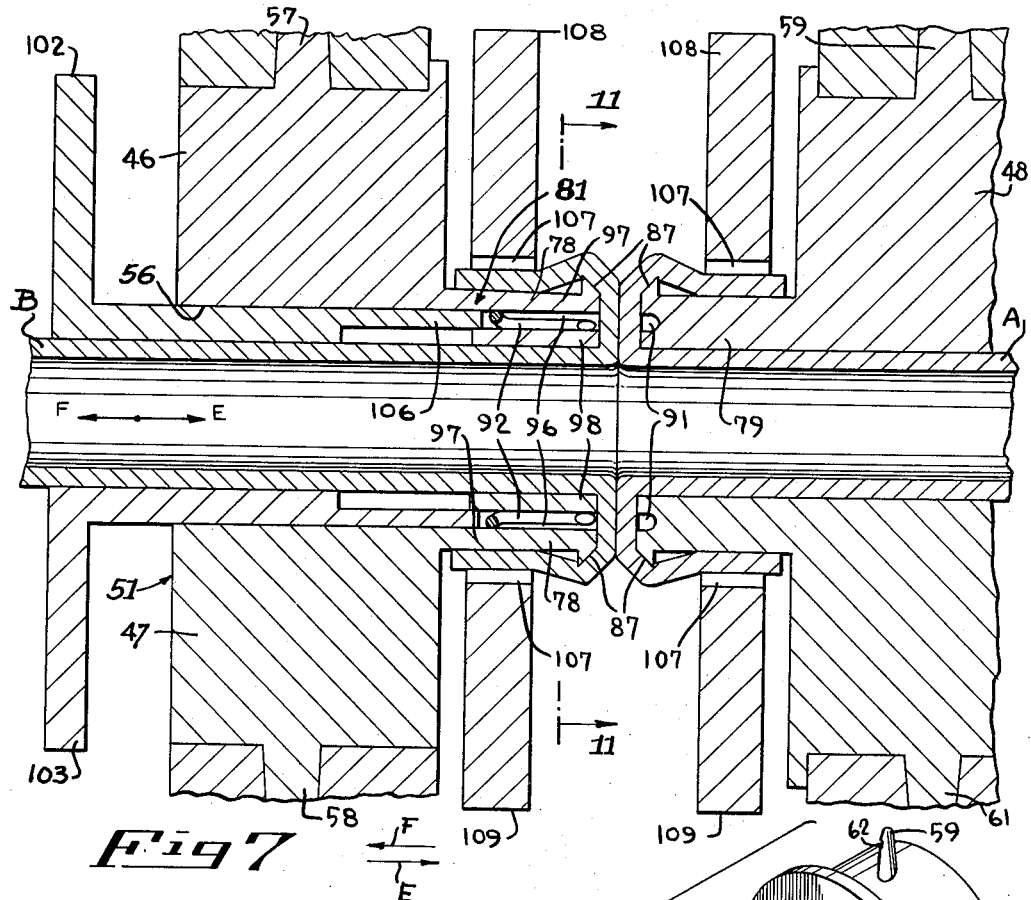
FIG. 7 is a sectional view, similar to FIG. 5 but showing on a larger scale a portion thereof including the vessel.

Each driver 102, 103 is normally disposed in the retracted position shown in FIGS. 5 and 7, in order to allow a staple 92 to be placed in each receptacle 96 between the front end of the pusher 102 and the port 99. When the driver 102 is pushed towards the anvil section in the direction E, it will expel its staple 92 from each receptacle 96 through the port 99 thereof and push it towards the pair of anvil surfaces 91 opposite the port 99.

Each driver 102, 103 is shiftable in the opposite directions E and F, and the materials and elasticity of the bushing, of the staples, and of the driver and the tolerances of the driver and the receptacles 106 are preferably so chosen that the resistance against movement in the directions E and F is sufficiently large to prevent accidental shifting of the pusher, and yet sufficiently small to make it unnecessary to exert great force on the pusher for staple expulsion.

*Examples, Materials*

In the foregoing it has been related that two receptacles are formed in each staple bushing-half, and hence each bushing-half carries but two staples, making a total of four staples for the entire stapling operation for any one vessel. The number of receptacles for each bushing, and hence of staples, however, depends on the size of the vessel to be worked on, and will vary with the vessel width and wall thickness. For large vessels three or more staples and hence receptacles may be arranged in each bushing-half, while for smaller vessels only two staples per bushing-half may be used as shown. Similarly, for small vessels, there will be used small size staples and small bushing-halves; conversely, for large vessels, the staples will be comparatively large and the bushing-halves accordingly big.

For example, for a blood vessel with an outside diameter of .060 in., the bushing dimensions may be as follows:

| | Inch |
|---|---|
| Inside radius of the cavity 54 | .030 |
| Thickness of the bushing wall | .005 |
| Thickness of the staple pusher 102 | .005 |
| Dimensions of the teeth 87 | .050 |

The diameters of wire for the staples may vary for instance from .005 in. to .080 in.

The material of the various parts may be as follows:

The staples 92 may be made of biologically inert material, for instance stainless steel or "Vitalium."

The instrument itself, namely the staple section 22 and the anvil section 23, including the forceps 28 all are preferably made of a biologically inert material such as stainless steel. The various levers and movable parts connected to or forming a part of the aforesaid sections 22 and 23 and including the drivers 102, 103 also preferably are made of biologically inert material, such as stainless steel or nickel silver. Stainless steel is among the preferred materials, because it not only is biologically inert and will not stain, but it is rigid and strong and yet may be sterilized and remains stable at the sterilizing temperatures. It will be understood, however, that the instant device is not restricted to stainless steel, and is limited in scope only as set forth in the claims hereof.

The staple bushing 46, 47, including the pin 57, 58, on the other hand, may be made of a translucent or even a transparent plastic material, for instance of an acetal resin such as a resin known under the trademark "Delrin," or other thermoplastic polymer, or other heat-stable and chemically stable synthetic plastic material. Each individual staple bushing-half is preferably molded in one piece including its cavity 54, teeth 87, receptacles 96, and ports 99. Since the bushing-half is at least translucent, the staples therein will cast a shadow, so that it is easy, by holding the bushing-half against a light source, to ascertain whether the bushing-half is loaded with staples— or empty.

In contrast to the staple bushing, the anvil bushing-halves 48, 49 may, in part at least, preferably be made of hard or hardened material, such as stainless steel or glass. The part that needs to be hard is the front part of the neck portion 79 in which the clinching grooves 91 are formed. Such a front part may therefore be connected to a separate bushing-half, with the front part made of hard material and the bushing-halves 48, 49 either of hard material or, like the staple bushing, made of soft material such as plastic, for instance "Delrin." In accordance with a preferred embodiment, however, the anvil bushing-half 48, 49 is made of one piece, of hard material such as, for example, stainless steel. In such a one-piece anvil bushing-half, the locating pins 59, 61 are made of the same hard and rigid material, and therefore, in contrast to the yielding plastic material of the locating pin 57, 61 of the staple bushings, are incapable of being cut into for latching; for this reason, the pins 59, 61 (FIGS. 5, 8) have grooves 62 for latching engagement, as previously explained.

If glass is used for the anvil, the locating pins 59, 61 may be made of a plastic material; no grooves would then be needed in this case.

The plastic material of the staple bushing-halves 46, 47, however, serves still another purpose besides translucency, moldability and ease in sterilizing; namely, it also prevents the staples from falling out of their receptacles prematurely during the surgical operation. Accidental falling out has been experienced with previous medical staplers, resulting not only in a hazard to the patient, but also causing the surgeon to waste time in hunting for staples that may have dropped out accidentally from the stapler. This hazard was due to the fact that the earlier staple bushings were made of metal, and in the loading of the instrument into the metallic staple bushings, the staples were bent to conform to the arch of the segmental chambers; if, during this loading, which is a delicate operation, any staple was bent too much, then the hazard of the staple drop-out was present; owing to the delicacy of the procedure, however, such a bending increase had been practically impossible to avoid; it is only when the staple was bent just enough to enter the arcuate chamber but insufficiently to move freely therein, that dropping out was prevented during operation with the old staplers.

In contrast thereto the instant stapler, owing to the use of the particular staple bushing-halves, avoids this hazard.

Figure 12:
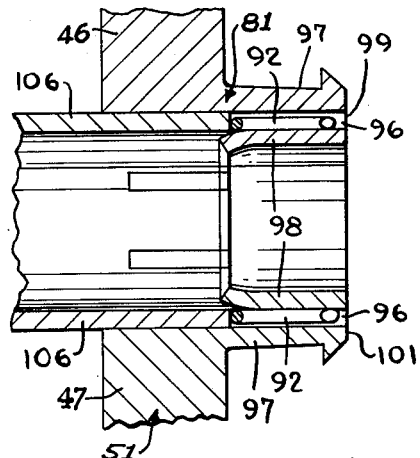
FIG. 12 is a sectional view taken on the line 12—12 of FIG. 11.
Figure 13:
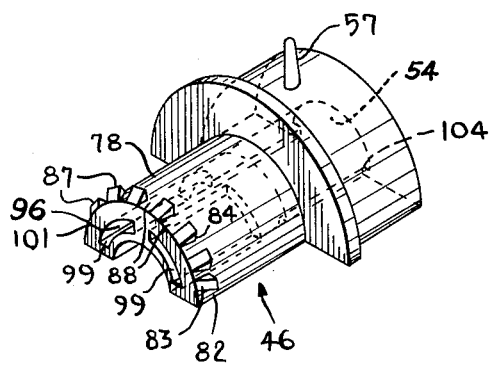
FIG. 13 is a perspective view of a staple bushing-half.

The plastic material used, for the staple bushing-halves, it must be pointed out, has substantially higher elastic properties than the stainless steel wire of the staple 92. Therefore, when the staple 92 (FIGS. 11, 12) is introduced in its receptacle 96, it will deform somewhat the walls 97 and 98 of the bushing-half, as clearly shown in FIGS. 11 and 12. This serves to restrain by friction any accidental falling out of a staple from its receptacle, limiting staple exiting to the time when the staple is purposely pushed out of the receptacle by the surgeon, by means of the pusher 102, 103. The staples 92 may be inserted, either by hand or by machine, with very little bending only (FIG. 11), the main bending force being taken up during the insertion of the almost straight staple 92 into the arcuate portions 99 by the yielding plastic walls 97 and 98 of the bushing-half.

*The Operation of the Medical Stapler*

In preparing for stapling, the surgeon will introduce the end portion of a circulatory vessel through the passage 56 of one of the sections of the assembled instrument, for instance the blood vessel A through the passage 56a of the anvil section 23 of the instrument. In order to prevent slipping back of the vessel A, the surgeon will squeeze the vessel together by means of the vessel clamps 38 and 39.

Figure 6:
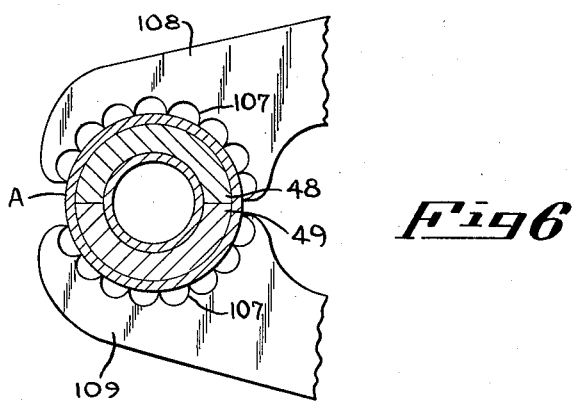
FIG. 6 is a large scale fragmentary sectional view, partly in section taken on the line 6—6 of FIG. 5.

The surgeon will thereafter overturn, in a cuffing manner, the end of the vessel A over the rim portion, such as the teeth 87 of both bushing-halves 48 and 49 which are united in the anvil section 23 to form the bushing 52. The cuffing will be done with the conventional surgical tools in such a manner that, as best shown in FIG. 7, the very end of the vessel is bent back over the teeth 87 for a distance sufficient to come to lie along practically the whole length of the neck portions 79 of the bushings 48 and 49. Subsequently, the surgeon will engage the overturned cuff of the vessel with the serrated surface 107 (FIG. 6) of upper and lower cuffing clamps 108 and 109 which are pivoted to the section.

The vessel end portion is thus held in a double engagement, namely a first engagement in which the exterior friction generating means on the neck portions of the bushings, namely the serrated rims 82 frictionally engage with their edges 86, and thereby anchor, the external surface, namely the adventitia of the vessel, and a second engagement wherein the cuffing clamps 108 and 109 with their serrated surfaces 107 engage the inner, namely the intimal surface of the vessel and press it towards the neck portions 79; the action by the cuffing clamps 108 and 109 also increase the engagement of the adventitia of the vessel with the teeth 87, forcing the adventitia to overlie the outermost edges 86 of the teeth 87, promoting the digging in, acually the biting by the teeth 87 into the adventitia without piercing it. Piercing, such as would be promoted by actual nails or needles or pointed pins, would have the disadvantage of being liable to lead to tearing and hence to slipping and to possible disengagement of the vessel; the instant tooth construction thus avoids this drawback that may be found in some earlier blood vessel holding devices.

Each of the cuffing clamps 108 and 109, as best shown in FIG. 4 has, similar to the vessel clamps 38 and 39, a lever that engages a serrated arcuate ratchet guide 111, 112 for positioning in any desired angular position.

As best shown in FIGS. 3 and 4, any of these clamps is mounted on the stapler removably for separate cleaning and sterilizing.

After the surgeon has completed the engagement of the vessel A on one of the sections of the instrument, he will proceed to the other section, where he will engage the other vessel B on the serrated rim and with the cuffing clamps of the other section, in this instance the stapler section, of the instrument. The vessels A and B are severed parts of one blood vessel A–B.

Subsequently, the surgeon will hinge together the two sections 22 and 23 by the hinge means 24, namely by engaging the pin 26 of one section in the aperture of the boss 27 of the other section. The boss and pin are sufficiently long to hold the two sections immovable relative to each other save for tilting about the axis of the pin 26 which constitutes the hinge axis, or for shifting axially. Movement about the hinge axis permits to bring together the two cuffed vessel ends into the stapling position (FIGS. 2, 5, 7) wherein the inner surfaces of the vessel make contact, and each port 99 of the staple bushings is disposed opposite a pair of anvil cams 91 of the anvil bushings.

A register pin 70 (FIG. 2) and bored boss 75 are provided to promote registry of the front ends of the sections 22 and 23 in the stapling position. While the hinge pin 26 is vertical, the register pin 70 is horizontal.

In order to make the contact between the intimal surfaces of the vessel in the stapling position with the proper force for stapling, adjusting means 113 (FIG. 2) are provided for adjusting the force with which the two forward ends of the sections 22 and 23 are pressed together. The adjusting means 113 include a threaded bolt 114 that is mounted on one of the sections, for instance the anvil section 23, and a nut 116 that engages the thread of the bolt 114 and when turned on the thread of the bolt will press with variably adjustable force against an extension 117 that is formed on the stapler section 22. By turning the nut 116, it will engage the extension 117 to force the rear ends of the sections 22 and 23 to turn about the hinge axis, resulting in the front parts of the sections being pushed towards each other.

The nut 116 may include an adjusting mechanism, to preset the force exerted between the vessels A, B. Such a mechanism may include a spring 118 and ratchet means 119, including scales to be read off, for pre-setting to limit precisely the force that may be transmitted by the nut 116 from the bolt 114 to the extension 117.

After the two vessels A, B have thus been put under proper contact pressure in the stapling position (FIG. 7), the surgeon will cause first one driver, for instance the driver 102, and thereafter the other pusher, for example the pusher 103, to be moved in the direction E (FIGS. 7, 8). An upper staple lever 121 is journalled on the staple section 22 for moving the upper driver 102, and similarly a lower staple lever 122 is journalled to the staple section 22 for shifting the lower driver 103.

After the stapling has been completed, the staples 92 will assume the form shown in FIG. 10, except that they will be arranged along the circle of the ports 99 and anvil cam surfaces 91 (FIG. 8).

Then, the surgeon will open the vessel clamps 38 and 39 to release the now joined vessels A–B.

The surgeon will subsequently thread back the nut 116 to release the pressure at the front end of the instrument and will disengage, though to only a small amount, the sections 22 and 23 from each other.

The surgeon will then push forwardly on the sections 22 and 23 the plates 66 and 71, thereby releasing and expelling the locating pins each together with its bushing-half.

Immediately thereafter, the surgeon will open the forceps 28, of both sections, thereby opening the bearing structures 33 of both sections, releasing all the bushing-halves. The cuffing clamps 108, 109, by their pressure, aid the discharge of the bushing-halves from the jaws 34, 36 of the bearing structures 33 of both instrument sections.

The surgeon will then carefully remove the instrument from the bushing-halves which still engage the cuffed parts of the vessel ends which have been stapled together. The instrument may now be put aside. Lastly, the surgeon will remove the bushing-halves from the cuffed part, with the aid of conventional surgical tools.

The interconnected vessel A-B will have the appearance as shown in FIGS. 16 and 17. If desired, one of the cuffs may be pushed over the other cuff, for instance manually, to assume the appearance as shown in FIGS. 18 and 19. This promotes intimal contact and more rapid healing.

Vessels thus stapled together, in the form of either FIG. 17 or of FIG. 19, have an excellent chance of growing connecting tissue in a healthy manner without any hazard to the patient, in spite of the fact that the staples which are of biologically inert material, such as stainless steel, are left embedded in the vessel.

All the parts of the instrument may be taken apart without special tools and cleaned and sterilized and thereafter reassembled.

In assembling the instrument, all the parts are put together except the bushings. In inserting the bushing-halves, the forceps 28 are kept open and each bushing-half is inserted in its respective section with the locating pins 57–59 inserted in their respective bores of the jaws, while their respective plates 66, 71 are held in the expelling position II. The staple bushing-halves 46 and 47 may carry their drivers 102, 103, respectively, during the bushing-halves emplacement. After the bushings are in place, the forceps 28 will be closed by locking the locks 32 (FIG. 3). The vessel clamps 108 and 109 will also be kept open, prepared to receive the vessels A, B for stapling.

The majority of the parts of the instrument remain the same for all vessel sizes. The difference in vessel sizes is taken care of by different size bushings and staples. The outer radius R (FIG. 8) of the body of all the bushing-halves for all size vessels is the same and fits into the bearing structures 33, while the other bushing-half dimensions, namely the size of the cavity 54, of the receptacles 96, of the staples 92, of the drivers 102, 103, of the neck portions 78, 79, and of the rim portions 82 vary with the blood vessel size. Thus, the same instrument can be used for various size vessels, merely by changing the bushings.

Certain of the advantages of the invention have already been referred to. It may be useful, however, to allude particularly at this point to the fact that the instant staple bushing-halves, 46, 47, are pre-loaded with staples, and are disposable and are made of inexpensive plastic that makes them expendable. Loading staples has heretofore been assigned either to the nurse or even to the surgeon in the operating room just before the operation. The instant invention renders it possible to load the staple bushing-halves with staples in the factory, and to fit them with the pushers, to sterilize this unit, and to furnish it to the hospital and to store it there in pre-packaged form, ready to be inserted into the instrument quickly and without any particular skill, while preserving the sterilized status.

In FIGS. 14 and 15 there is shown a preferred package of this type. It comprises a cartridge 123 that has a cover 124 with which it defines a holding chamber 126. The material of the cartridge 123 and of the cover 124 may be glass or any other similar, preferably translucent, material such as "Lucite." The cover 124 fits sufficiently tightly on the structure 123 to maintain the chamber 126 sterile after the whole has been sterilized.

If desired, the cartridge 123 may be enclosed in a sterile plastic envelope (not shown).

In the top surface 127 of the cartridge 123, there are formed recesses 128 which serve to accommodate a staple bushing-half 46 or 47 in such a manner that the diametrical end surface 53 of the bushing-half rests in the recesses 128, and is thus always held in position with the locating pin 57 held upright. The cartridge 123 with the cover 124 thus forms a carrier for the bushing-half to hold it in a predetermined position so that the bushing-half can easily be pushed into its position on the instrument, all without any need to touch the bushing-half by hand. A similar cartridge may be devised for the anvil bushing-half, if desired. The cartridge protects the sterilized bushing-half, while the pusher may be inserted in the right position in the bushing-half, and maintains the whole sterilized. In this manner, bushing-halves for different size vessels can be stored paired for staples and anvils in the hospital in sufficient number in advance of their use, labeled and ready to be inserted into the instrument just before the operation, without any special skill.

Another advantage is that pre-loading and sterilization in the factory may be done on a production line, thereby decreasing the costs. All three parameters of the staple 92, namely length of base, length of leg and wire diameter may be varied for different cartridges, depending on the size of the vessel or whether the vessel is an artery or a vein. Even the material may be varied; some surgeons may prefer stainless steel, some may prefer Vitalium. Each cartridge would be labeled, and both surgeon and nurse would have the benefit of simplicity and speed in readying the instrument.

After the operation, the inexpensive plastic staple bushing-halves are discarded. The staple bushing-halves are molded from plastic which, on a large production scale, may bring down the cost for each bushing-half sufficiently to render its re-use uneconomical as compared to a new, pre-sterilized, pre-loaded and fully packaged bushing prepared in a factory. The standardization of the outside radius R of all the bushings enhances the economics of the stapler even on an international scale.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. In a medical stapler, the combination of a stapler section and an anvil section, hinge means between said sections operable for removably interengaging said sections for performing suturing stapling, each section including a releasably closed bearing structure, two semi-cylindrical staple bushing-halves removably disposed in registry in the bearing structure of the stapler section and two semi-cylindrical anvil bushing-halves removably disposed in registry in the bearing structure of the anvil section, the bushing-halves in the bearing structure of each section completing a cylindrical bushing including a projecting tube defining a central passage, each staple bushing-half defining receptacles for staples including arcuate staple exit ports, the receptacles and the ports of said staple bushing in said stapler section being arranged along a circle coaxially in said tube, the anvil bushing in the anvil section defining on the tube an anvil surface disposed opposite said ports when said sections are hinged together, movable propelling means connected to the stapler section and being operable to propel each staple out of its receptacle through a port, each bushing-half carrying a pin, each bearing structure defining two opposite bores each receiving a pin for positioning the bushing-halves thereof in registry to complete the bushing, latching means connected to each section and being operable for releasably engaging said pin for holding it in the bore thereby holding the bushing-half thereof in position in the bearing structure, and adjusting means operable for adjusting the force exerted between the ports and anvil surface when the two sections are hinged together said latching means being movable between a first holding position, wherein said means releasably engages said pin when said pin is in the bore thereby restraining removal of the pin from the bore, and a second ejecting position wherein said means expels the released pin from said bore.

2. In a medical stapler, as claimed in claim 1, said tube of each housing being arranged to receive the cuffed end portion of a circulatory vessel extending through said passage, and a cuffing clamp connected to each section and having a serrated surface and being operable to engage with said serrated surface the vessel portion cuffed on said tube anchoring said vessel portion while pressing it onto the tube.

3. In a medical stapler, as claimed in claim 1, each tube including on its exterior means operable to anchor securely the overturned cuffed portion of a circulatory vessel end passing through said passage, despite variations in width and wall thickness of the vessel.

4. In a medical stapler, as claimed in claim 1, each tube including on its exterior a serrated rim operable to anchor securely the overturned cuffed portion of a circulatory vessel end passing through said passage, despite variations in width and wall thickness of the vessel.

5. In a medical stapler, as claimed in claim 1, said adjusting means including resilient means operable for adjustably pre-setting the force to be exerted between said sections, and ratchet means arranged to restrain application between said sections of any force beyond said pre-set force.

6. In a medical stapler, as claimed in claim 1, each staple bushing-half adapted to receive in each receptacle a staple loaded prior to the insertion of the bushing-half into the stapler section, and each staple being positioned in its receptacle to be propelled through a port.

7. In a medical stapler, as claimed in claim 1, each staple bushing-half being composed of plastic material, the walls of each receptacle having substantially higher elastic properties than a staple, so that each staple when introduced into a receptacle will deform at least some of the walls thereof for frictionally restraining accidental staple drop-out.

8. In a medical stapler, as claimed in claim 1, the pin of each bushing-half being tapered, and the bore for each pin being tapered in accordance with the same taper, said taper being non-locking.

9. In a medical stapler, as claimed in claim 1, each staple bushing-half being composed of a one-piece body defining said receptacles adapted to receive staples on the interior, said body being of non-metallic material wherein staples in the receptacles are visible through the material.

10. A staple bushing-half, for use together with a second bushing-half to complete a bushing releasably positionable in the bearing structure of a suturing stapler having a bore near each bushing-half, comprising a one-piece non-metallic body including a neck portion adapted to complete with a corresponding portion of the second bushing-half a projecting tube having a central passage, said neck portion defining segmental receptacles, each receptacle being adapted to receive on the interior a staple and having an arcuate port communicating with said receptacle for staple exit, and a radial tapered projection formed on said body and adapted to position said bushing-half in said bearing structure.

11. A staple bushing-half, for use together with a second bushing-half to complete a bushing releasably positionable in the bearing structure of a suturing stapler, comprising a one-piece non-metallic body including a neck portion adapted to complete with a corresponding portion of the second bushing-half a projecting tube having a central passage, said neck portion defining segmental receptacles adapted to receive staples on the interior and having ports for staple exit, and a tapered pin of a non-locking taper radially projecting from said body and adapted to be engaged in a bore of a like taper in said bearing structure.

12. A staple bushing-half, for use together with a second bushing-half to complete a bushing releasably positionable in the bearing structure of a suturing stapler, comprising a one-piece body including a neck portion adapted to complete with a corresponding portion of the second bushing-half a projecting tube having a central passage, said neck portion defining segmental receptacles adapted to receive staples on the interior and having ports for staple exit from said receptacles, said body being of non-metallic material wherein staples in the receptacles are visible through the material.

13. A staple bushing-half, for use together with a second bushing-half to complete a bushing releasably positionable in the bearing structure of a suturing stapler, comprising a one-piece body composed of non-metallic material, defining segmental receptacles adapted to receive staples on the interior and having ports for staple passage to and from said receptacles, the wall of each receptacle having substantially higher elastic properties than a staple, so that each staple when introduced into a receptacle will deform at least some of the walls thereof for frictionally restraining accidental staple drop-out.

14. In a medical stapler, the combination of a stapler section and an anvil section, hinge means between said sections operable for removably interengaging said sections for performing suturing stapling, each section including a releasably closed bearing structure, two semi-cylindrical staple bushing-halves removably disposed in registry in the bearing structure of the stapler section and two semi-cylindrical anvil bushing-halves removably disposed in registry in the bearing structure of the anvil section, the bushing-halves in the bearing structure of each section completing a cylindrical bushing including a projecting tube defining a central passage, each staple bushing-half defining receptacles for staples including arcuate staple exit ports, the receptacles and the ports of said staple bushing in said stapler section being arranged along a circle coaxially in said tube, the anvil bushing in the anvil section defining on the tube an anvil surface disposed opposite said ports when said sections are hinged together, movable propelling means connected to the stapler section and being operable to propel each staple out of its receptacle through a port, and latching means between the bearing structures and the bushing-halves and having a portion connected to each section movable between a first holding position wherein said means releasably engages the bushing-half holding the bushing-half in the bearing structure and, respectively, a second ejecting position wherein said latching means releases and expels the released bushing-half from its emplacement in the bearing structure.

References Cited in the file of this patent

UNITED STATES PATENTS

| | | |
|---|---|---|
| 685,091 | Becton | Oct. 22, 1901 |
| 2,112,926 | Pankonin | Apr. 5, 1938 |
| 2,555,863 | Slaughter | June 5, 1951 |
| 2,940,451 | Vogelfanger | June 14, 1960 |
| 2,965,900 | Inokouchi | Dec. 27, 1960 |
| 3,010,569 | Goldman | Nov. 28, 1961 |